United States Patent [19]

Milo

[11] 3,755,801
[45] Aug. 28, 1973

[54] DETECTING HELIUM LIQUID LEVEL

[75] Inventor: William C. Milo, Anaheim, Calif.

[73] Assignee: The United States of America as represented by the Secretary of the Army

[22] Filed: Jan. 12, 1972

[21] Appl. No.: 217,180

[52] U.S. Cl. .......................... 340/244 R, 340/248 A
[51] Int. Cl. ................................................ G08b 23/00
[58] Field of Search .................... 340/244 R, 244 C, 340/248 A, 248 C, 248 B; 73/295

[56] References Cited
UNITED STATES PATENTS
3,097,496  7/1963  Petts et al. ........................ 73/295 X
3,465,587  9/1969  Pierce ................................... 73/295

FOREIGN PATENTS OR APPLICATIONS
1,106,716  3/1968  Great Britain ....................... 73/295

*Primary Examiner*—John W. Caldwell
*Assistant Examiner*—Daniel Myer
*Attorney*—William G. Gapcynski, Lawrence A. Neureither et al.

[57] ABSTRACT

A constant current is fed through a pair of silicon diodes whose voltage varies with the heat sinking capability of its surrounding. These diodes are positioned at the top level of the liquid helium and the voltage across the diodes are compared by two comparators. One comparator lights a signal light whenever one or more diode is in the liquid helium, and the other comparator lights the signal light only when both diodes are in the liquid.

2 Claims, 2 Drawing Figures

DETECTING HELIUM LIQUID LEVEL

SUMMARY OF THE INVENTION

A voltage source feeds a constant current through a pair of silicon diodes. The voltage drop at the diodes varies with the heat sinking capability and the temperature of the environment of the diodes. The forward voltage drop across a diode with the current held constant varies inversely as the temperature of the junction. Liquid helium (boiling) and gas helium just above the liquid state have approximately the same temperature but vary drastically in their heat sinking capabilities.

First and second comparators are connected to sense the voltage of the constant current source driving the diodes. Each comparator is connected to an individual signal light. The first comparator will sense the voltage change when one diode is emerged into the liquid and will cause its signal light to light. The second comparator is set such that it will light its signal light only when both diodes are emerged in the liquid helium.

The sensors can be used in two configurations. First, the sensor can be mounted at slightly different heights in a dip tube which is inserted to the bottom of the dewar. The dip tube drives a sliding scale which is set at zero when the dip tube is at the bottom. The dip tube is then removed until the electronics signal that one diode is out of the liquid when the signal light of one of the comparators goes out. The sliding scale can now be read, and the height of the liquid can be measured. In the second configuration the sensors are mounted in the dewar wall at slightly different heights. If the liquid touches one of the sensors, a liquid indication will be registered by one of the comparators. In this way an over or under liquid level condition can be determined by observation of the signal lamps.

DESCRIPTION OF THE PREFERRED EMBODIMENT

The forward voltage drop across a silicon diode, in which the current is held constant, varies inversely as the temperature of the junction. The temperature of the junction is determined by two major factors: ambient temperature and the heat sinking capability of the surrounding ambient. The temperature of helium or neon at the boiling point of gas just above the liquid state have approximately the same temperature. Therefore, a diode in this ambient surrounding would not change its characteristics due to the temperature of either the liquid or the gas. However, the difference in the heat sinking capabilities between the gas and the liquid varies drastically as the helium liquid is a much better heat sink than the gas. The temperature of the junction of a silicon diode would vary drastically between a gas and a liquid ambient, and this change would be reflected in the voltage across the diode if the current is held constant.

Figure 1:
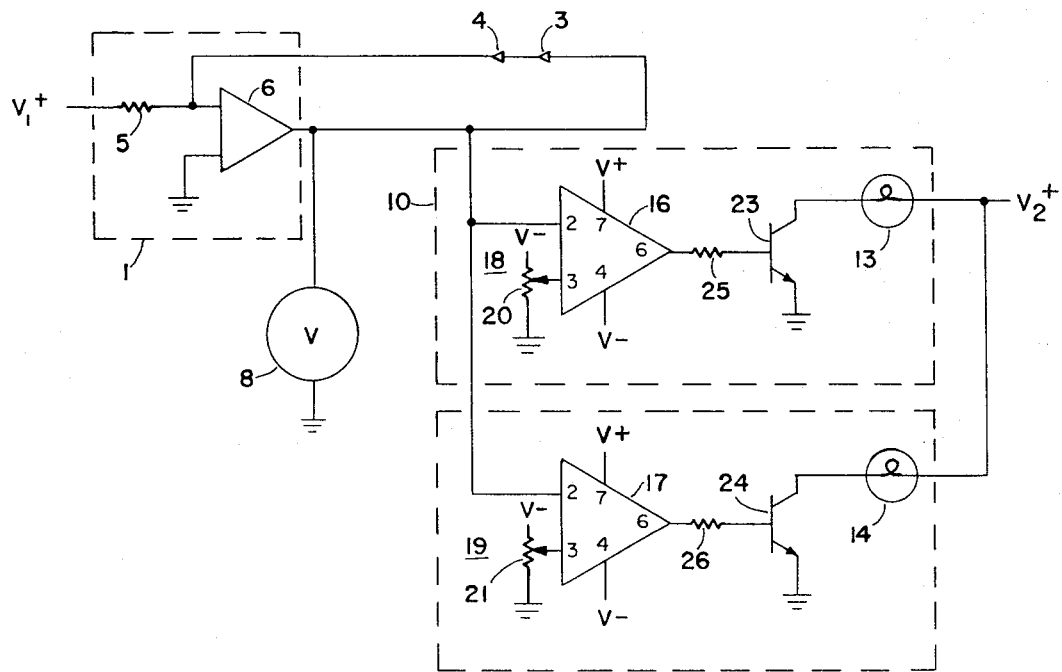
FIG. 1 is a schematic showing of a preferred embodiment of the present invention.

FIG. 1 shows a circuit to utilize this principle. A constant current source 1 is supplied by a voltage V1 and supplies a constant current to silicon controlled diodes 3 and 4. The constant current source 1 can take any of the well known forms such as the series resistor 5 and amplifier 6 connections shown in FIG. 1. A voltmeter 8 is connected across the constant current source so as to monitor its voltage. The voltage of voltmeter 8 will indicate wheither or not the diodes are emerged into the liquid or in the gas as there will be a certain high value of voltage reading when both the diodes 3 and 4 are in the liquid, a somewhat lower voltage when one diode is out, and a still lower voltage when both diodes are in the gas ambient surroundings. However, this method of monitoring the voltmeter 8 is not convenient; therefore, two comparators 10 and 11 are provided to drive signal lights 13 and 14 for a visual indication of the positions of diodes 3 and 4.

Both comparators have a amplifier 16 and 17 having one input connected to the constant current source 1 and another input connected to a reference voltage 18 and 19. The value of this reference voltage is controlled by the slider arm position of resistors 20 and 21. The amount of reference voltage 18 is adjusted such that amplifier 16 will have an output just sufficient to turn on transistor 23 when one diode is in the liquid but will not have enough output to turn on transistor 23 when neither diode is in the liquid. Amplifier 16 is connected to transistor 23 by way of resistor 25. The amount of the reference voltage 19 is adjusted such that the amplifier 17 will have just sufficient output to turn on transistor 24 when both diodes 3 and 4 are emerged in the liquid but will not have enough output to turn on transistor 24 when just one diode is emerged in the liquid. Amplifier 17 is connected to transistor 24 by resistor 26. Power to drive transistors 23 and 24 along with their indicator lights 13 and 14 is provided by the voltage supply B2.

Figure 2:
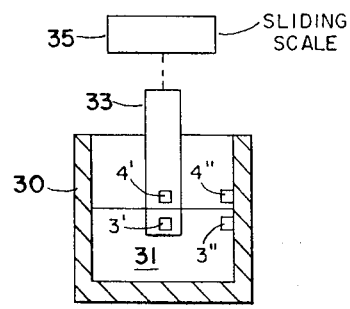
FIG. 2 is a diagrammatic showing of two structure configurations of the present invention.

FIG. 2 shows two possible configurations for positioning the diodes 3 and 4 into the dewar 30. A cryogenic liquid such as helium 31 will have varying depths due to evaporation and other factors. It is very often necessary to sense these depths and know what the cryogenic liquid level is. One method is to use a dip tube 33 having the diodes 3' and 4' inserted therein separated by a small distance along the length of the tube. The dip tube is inserted to the bottom of the dewar and the sliding scale is set to zero or a certain value above zero which will be the height from the bottom of the tube to the center of the diode pair. Dip tube 33 is then drawn upward until indicator light 14 (FIG. 1) goes out while indicator light 13 is still on. Then the sliding scale can read directly the height of the liquid in the dewar 30. If the scale were set to zero then the dip tube could be further moved until indicator light 13 also goes out.

If the desired level of the cryogen is known that the diodes 3'' and 4'' can be inserted into the walls of the dewar. Indicator lamps 13 and 14 will let the operator know when the liquid level is between the diode 3'' and diode 4'', as when this condition is present, one indicator lamp will be lit and the other will be off. When both lamps are lit then the liquid cryogen level will be known to be above the position of diode 4'', and when both lights are off then the cryogen level will be known to be below the level of diode 3''. The same indications could be obtained by moving the dip tube 33 to the desired height as read on sliding scale 35.

I claim:

1. An indicating device comprising a constant current source; at least one diode connected to said constant current source so as to be supplied thereby; first comparator means connected to said constant current source and said diode; a first indicating means having an input whereby it can be turned on or off; said comparator means having a voltage value at its output sufficient to turn on said indicating means when said constant current source is over a predetermined voltage value; means connecting the comparator's output to the input of said indicating means; a second diode connected to be supplied with constant current by said constant current source; a second comparator; a second indicating means; said diodes being subjectable to first and second ambient surroundings; said first ambient surrounding having a poor heat sink capacity as compared to the heat sink capacity of the second ambient surrounding; both comparator means turning said first and second indicating means to an on condition when both diodes are in said second ambient surrounding; both said comparator means turning said indicator means to an off condition when both said diodes are in said first ambient surroundings; and one of said comparator means turning said indicating means to an on condition while the other comparator means turns its indicator to an off condition when said diodes are in different ambient surroundings.

2. An indicating device as set forth in claim 1 wherein said first ambient surrounding is gaseous helium and said second surrounding is liquid helium; each of said indicating means comprising an indicating lamp connected in series with a transistor and a voltage source; the input for the indicator means being the input to the transistor; each of said comparator means having an amplifier with an output connected to the input of said transistors; first and second variable reference voltage connected individually to one input of different amplifiers; and the other inputs of said amplifiers being connected to said constant voltage source.

* * * * *